Figure 5:
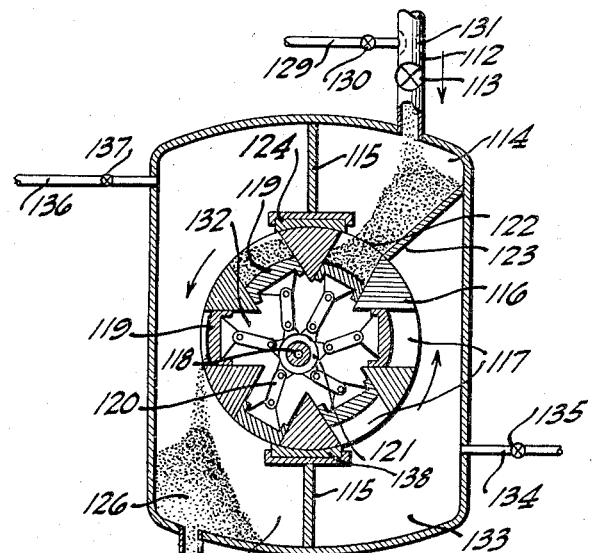

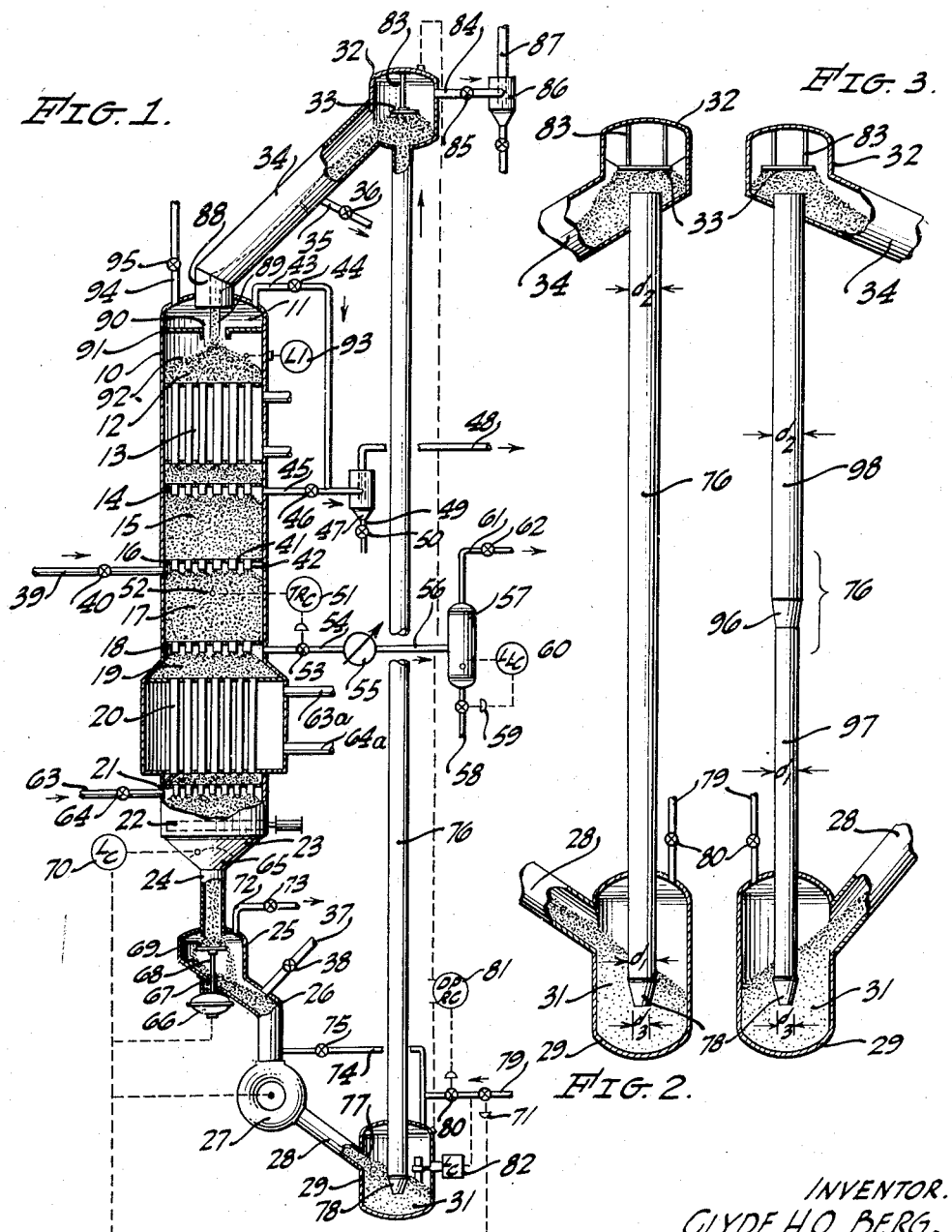

July 27, 1954

C. H. O. BERG 2,684,870

CONVEYANCE OF GRANULAR SOLIDS

Filed Dec. 24, 1948

2 Sheets-Sheet 2

INVENTOR.
CLYDE H.O. BERG,
BY Ross J. Garofalo
ATTORNEY.

Patented July 27, 1954

2,684,870

UNITED STATES PATENT OFFICE 2,684,870

CONVEYANCE OF GRANULAR SOLIDS

Clyde H. O. Berg, Long Beach, Calif., assignor to Union Oil Company of California, Los Angeles, Calif., a corporation of California Application December 24, 1948, Serial No. 67,237

34 Claims. (Cl. 302—53)

This invention relates to a method for the conveyance of granular solids and in particular is directed to an improvement in the selective adsorption process in which this method of solids conveyance is employed.

The selective adsorption process is a process for the separation of gaseous mixtures in which the gaseous mixture to be separated is contacted countercurrently with a substantially compact downwardly moving bed of solid granular adsorbent such as charcoal, silica gel, aluminum oxide, or the like. The contact is effected at substantially atmospheric temperatures or a little above and the more readily adsorbable constituents of the gaseous mixture are adsorbed forming a rich adsorbent leaving the less readily adsorbable constituents as a substantially unadsorbed gas. The rich adsorbent is subsequently heated to a temperature usually not exceeding about 500° F. and is directly contacted countercurrently with a stripping gas such as steam to remove adsorbed constituents from the adsorbent. The thus desorbed constituents comprise a rich gas and a lean adsorbent remains substantially saturated at the stripping temperature with the stripping gas. The lean adsorbent subsequently is cooled to the adsorption temperature and is recycled to the adsorption zone to contact further quantities of the gaseous mixture to be separated.

The selective adsorptivity, the property noted in adsorbents whereby certain constituents are adsorbed more strongly than are others, is the basic principle upon which the selective adsorption process functions. The combination of process steps briefly outlined above amplifies the selective adsorption properties of the adsorbent whereby unusually efficient separations of gaseous mixtures result at moderate conditions of temperature and pressure. The selective adsorption process possesses advantages over the conventional gas separation processes involving adsorption, extraction, or distillation in which excessively high pressures and unusually low refrigeration temperatures are required in the separation of many gaseous mixtures. For example, a distillation column producing methane as an overhead product must operate at pressures ranging from 500 to 600 pounds per square inch and with a reflux temperature of about −150° F. A pure methane product may be obtained from natural gas at pressures below 100 pounds per square inch and at maximum temperatures in the range of from 300 to 400° F. maximum employing the selective adsorption process.

The adsorbent in the selective adsorption process is recirculated as a substantially compact and continuously moving bed downwardly by gravity through the selective adsorption column. The adsorbent is removed from the bottom of the column and conveyed to the top thereof for repassage through the individual zones or sections of the column. It has been the practice in employing the selective adsorption process to suspend the adsorbent removed from the bottom of the column in a gaseous mixture called a lift gas to form a gaseous suspension of adsorbent granules which is passed through a vertical conduit called a lift line to an impactless separator situated adjacent to the top of the column. Herein the suspension is broken and the adsorbent granules conveyed by gravity to the top of the column. The selective adsorption process employing this means of adsorbent conveyance has proved unusually successful as an efficient means for maintaining the continuous adsorbent circulation.

It is the purpose of this invention to provide an improved selective adsorption process and apparatus whereby increased quantities of adsorbent may be circulated while employing lift lines or conveyance conduit of reduced diameter. The conveyance method described herein is applicable to those selective adsorption installations in which the rate of adsorbent circulation is quite high such as for example greater than 10,000 pounds per hour.

It is a primary object of this invention to provide a selective adsorption process improved by the incorporation of a simplified method for circulating large quantities of granular adsorbent.

A further object of this invention is to provide a means for the conveyance of granular solids as a substantially compact moving bed upwardly through a conduit in the absence of mechanical lifting devices such as bucket elevators, drag lines, and the like.

A further object of the present invention is to provide an apparatus for the conveyance of any granular solids as a substantially compact vertically moving bed.

Other objects and advantages of this invention will become apparent to those skilled in the art as the description and illustration thereof ensues.

Briefly, the present invention comprises an improved selective adsorption process in which the granular adsorbent is conveyed upwardly through the lift line and downwardly through the adsorption column in substantially the same condition of solids bulk density. It has now been found that a conduit may be maintained with a vertically rising mass of solid granular adsorbent in which the bulk density of the solids is substantially the same as the bulk density of the solids when at rest as static bulk density.

This is accomplished by forcing a flow of lift gas upwardly through the interstices of the granules to establish frictional forces (indicated by the pressure differential) which are sufficient to overcome the gravitational forces on the adsorbent granules as well as the frictional forces of the conduit walls on the moving bed of adsorbent and cause the mass to move upward. The actual velocity of lift gas necessary to accomplish this result is dependent upon the size and density of the granules, and the viscosity of the lift gas which is directly determined by the pressure and temperature. The velocities are generally sufficient to cause fluidization of the adsorbent granules if the adsorbent granules were free to fluidize or become suspended in the lift gas. In order to prevent fluidization of the adsorbent granules in the lift gas and maintain the granules as a substantially compact bed, means are incorporated at the upper extremity of the lift line or lift conduit to dissipate the thrusting forces of the upwardly moving bed. Fluidization of solid particles in a gas is possible only when the quantity of gas is sufficient to suspend the particles and the individual particles are free to move and be suspended in the absence of a compacting force. Such a compacting force or compressive force is applied at the upper extremity of the lift line in the form of a thrust plate having a diameter somewhat larger than that of the lift line and against which the moving bed of granular adsorbent changes its direction of flow to one of gravity flow through a transfer line into the top of the treating vessel or other enclosure in which the granular solids being transported are desired.

Pressure differentials established across the lift conduit by the flow of gas in the moving bed of substantially compact solids depend of course upon the lift gas flow rate, the solid particle size, and other physical conditions. In the conveyance of solid granular charcoal as employed in the selective adsorption process, pressure drops ranging from 10 to as high as 150 pounds per square foot per foot or from about 0.06 to about 1.0 pound per square inch per foot of lift line height are common. Superficial lift gas velocities through the lift line range from as low as 0.2 of a foot per second to as high as 20 feet per second and the granular solids are thereby conveyed in a plug type flow through the lift line characterized by the fact that the individual adsorbent granules are inhibited from any substantial motion relative to one another. For 12 to 30 mesh granular charcoal, superficial gas velocities of from about 0.5 to 10 feet per second may be used with about 1 to 4 feet per second considered optimum. These velocities are insufficient to cause fluidization. The removal of the thrust plate at the top of the lift line described above would, under conditions of maximum gas flow, cause the suspension of the solids in the lift gas and the transferal of great quantities of lift gas per unit weight of granular solids conveyed. Preferred gas velocities are those between about 10% and about 90% of that necessary to cause fluidization of a given solid. The prevention of fluidization by the means described above permits the conveyance of the greatest mass of granular solid per unit volume of lift gas and thus the diameter of the conduit necessary for conveyance of granular solids which are circulated through continuous treating or adsorption processes is considerably reduced. It has further been found that since the individual solid particles are prevented from physical motion relative to one another and that the substantially compact mass of solids flows as a cylinder or plug through the lift conduit, loss of solids due to attrition is very low.

In the fluidization of granular solids of 12 to 30 mesh size in upwardly moving gases, lineal gas velocities of from about 10 to 30 feet per second are used. For powdered solids such as catalysts finer than 150 mesh, velocities of from 0.5 to 5 feet per second are used. Under these conditions, the volume of gas per unit weight of solids moved is high and the pressure drop is low. From about 5 to 15 standard cubic feet of air are required to suspend 1 pound of 12 to 30 mesh adsorbent in a suspension or fluidization type conveyance conduit. In the present conveyance apparatus the quantity of lift gas is markedly lower, varying between as low as 0.02 to as high as 1 standard cubic foot per pound of such an adsorbent. This material has been found to be easily and efficiently transported as a substantially compact mass at gas rates of 0.05 to 0.5 standard cubic feet per pound depending on the size and density of the granules. In the present apparatus the above gas flow conditions cause flow of granular solids through lift lines at from 0.5 to as high as 5.0 feet per second or higher, one typical unit operating between 1.5 and 2.8 feet per second.

Figure 4:
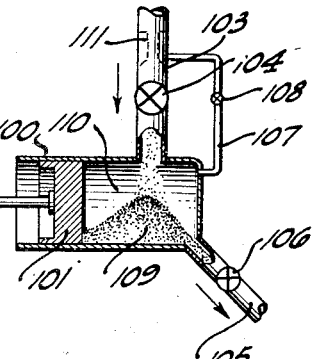
Figure 6:
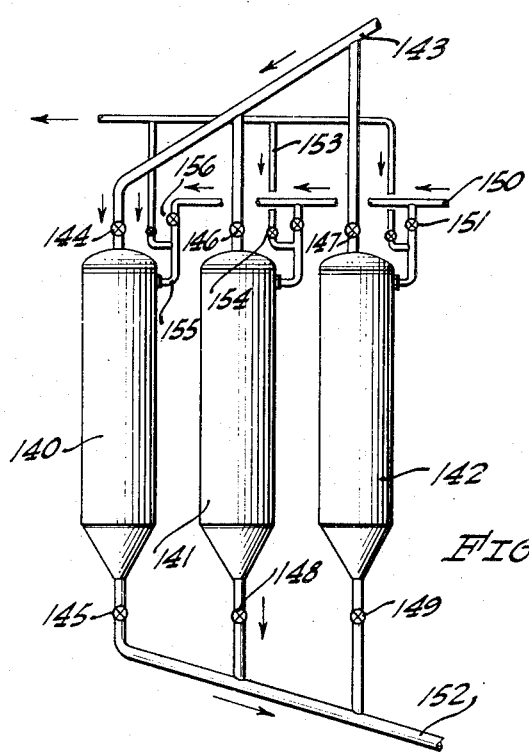

The improved selective adsorption process and apparatus and the improved method and apparatus for conveyance of granular solids may be more readily understood by reference to the accompanying drawings in which Figure 1 is a cross sectional elevation view of a selective adsorption column for the separation of gaseous mixtures in which the improved lift conveyance of the present invention is incorporated, Figures 2 and 3 are modifications of the lift line in which provision has been made for the expansion of lift gas due to the decrease in lift gas pressure from the bottom to the top, Figure 4 is a schematic drawing of a positive displacement solids pump whereby the granular solids are passed through a positive pressure differential, Figure 5 is a schematic drawing of a continuous multi-cylinder solids displacement pump by means of which particles of granular solids may be passed from low pressure environment to a high pressure environment substantially without a reverse flow of gas from the high pressure to the low pressure points, and Figure 6 is a schematic drawing of a modified apparatus used in conjunction with the improved lift line to introduce granular solid materials through a positive pressure differential without a substantial reverse flow of gas.

Referring now more particularly to Figure 1, selective adsorption column 10 is provided at successively lower levels therein with elutriation zone 11, adsorbent hopper zone 12, cooling zone 13, lift gas disengaging zone 14, adsorption zone 15, feed gas engaging zone 16, rectification zone 17, rich gas disengaging zone 18, preferential desorption or steaming zone 19, heating zone 20, stripping gas inlet zone 21, adsorbent feeder zone 22, bottom zone 23, sealing leg 24, adsorbent flow control valve zone 25, transfer line 26, pressuring means 27 with which solid adsorbent is transported through a pressure differential without the reverse flow of gas, second transfer line 28 and lift line induction zone 29. Lift line 76 extends into induction zone 29 to a point substantially below the level of adsorbent mass 31 and is provided at its upper extremity with separator zone 32 provided with thrust plate 33 which prevents the adsorbent granules from becoming fluidized and maintains them in a substantially compact condition. Upper transfer line 34 is provided whereby solids are conveyed from separator 32 to elutriation zone 11 in the upper portion of selective adsorption column 10. Line 35 controlled by valve 36 is provided to remove a portion of the circulating stream of adsorbent and subject it to a separate high temperature steam treatment to remove accumulated high molecular weight substances adsorbed on the adsorbent. The reactivated absorbent is then returned from the reactivator, not shown in this figure, to the circulating stream of adsorbent via line 37 controlled by valve 38.

The description of the operation of the selective adsorption apparatus illustrated in Figure 1 will be presented in the form of a typical example of the selective adsorption process in which the compact feed lift line is employed. The selective adsorption column is applied to the separation of 15,646 MSCF per day of a refinery gas containing olefins. The column is 9 feet 8 inches inside diameter and about 180 feet tall. Activated coconut charcoal is employed as the adsorbent and is circulated through the column at a rate of 122,200 pounds per hour. The gaseous mixture has the following composition:

TABLE

*Feed gas composition*

| | Volume percent |
|---|---|
| Inorganic gases | 3.76 |
| Hydrogen | 11.69 |
| Methane | 46.83 |
| $C_2$'s | 27.31 |
| $C_3$'s | 9.05 |
| $C_4$'s | 1.10 |
| $C_5$'s | 0.15 |
| $C_6+$ | 0.11 |
| | 100.00 |

The feed gas mixture is introduced via line 39 controlled by valve 40 into feed gas engaging zone 16 which comprises transverse plate 41 filling the entire cross sectional area of the column and provided with a series of tubes 42 through which the charcoal flows. The feed gas mixture passes upwardly through tubes 42 into adsorption zone 15 wherein the $C_2$ and higher molecular weight hydrocarbons are adsorbed on the charcoal. The $C_1$ and lower molecular weight gases remain substantially unadsorbed, although a small quantity of these constituents is adsorbed with the higher molecular weight constituents. The unadsorbed gas, herein termed a "lean gas" or "discharge gas," passes upwardly to lean gas disengaging zone 14. Here the stream divides and a part is passed upwardly countercurrent to the flow of charcoal through the tubes of cooling zone 13 in order to saturate the fresh or lean charcoal with constituents of the lean gas and to desorb traces of stripping gas from the charcoal. This fraction is termed the "purge gas" and is removed from adsorbent inlet zone 11 via line 43 controlled by valve 44 and is combined with the remaining part of lean gas which is removed from lean gas disengaging zone 14 via line 45 controlled by valve 46. This lean gas product passes into separator 47 wherein fine suspended particles of charcoal are removed and the lean gas product passes to further processing or storage facilities not shown via line 48 at a rate of 9750 MSCF per day. Adsorbent fines are removed from separator 47 via line 49 controlled by valve 50.

The charcoal containing the adsorbed fraction of the feed gas mixture is termed a "rich charcoal" and passes downwardly through feed gas engaging zone 16 into rectification zone 17 wherein it is contacted with a countercurrent flow of rich gas reflux containing substantially pure $C_2$ and higher molecular weight hydrocarbons. In this step the constituents of the reflux gas are preferentially adsorbed by the charcoal and lower molecular weight gases are preferentially desorbed and returned to the adsorption zone. The degree of refluxing action is controlled by increasing or decreasing the rate at which the rich gas product is removed from the column. The charcoal in equilibrium with the reflux gas attains a higher equilibrium temperature than the temperature of the adsorption zone and the reflux rate therefore is temperature controlled by means of temperature recorder controller 51 actuated by thermocouple point 52 in contact with the charcoal. The temperature recorder controller actuates control valve 53 by means of which the rate at which the rich gas product is withdrawn from rich gas disengaging zone 18 via line 54 is controlled. The rich gas is passed through surface condenser 55 wherein it is cooled and then via line 56 into vapor liquid separator 57. Herein any condensate from the rich gas product is separated and is removed therefrom via line 58 at a rate controlled by valve 59 which in turn is actuated by liquid level controller 60. The condensate-free rich gas then passes via line 61 controlled by valve 62 to further processing or storage facilities not shown at a rate of 5895 MSCF per day.

The rectified charcoal passes through the tubes of rich gas disengaging zone 18 into preferential desorption zone or steaming zone 19 wherein it is contacted by a countercurrent flow of a preferentially adsorbed stripping gas such as steam. Part of this stripping gas is introduced into stripping gas engaging zone 21 via line 63 controlled by valve 64 and the remaining part is desorbed in the lower portion of heating zone 20 from the charcoal by indirect heating. This gas rises through the tubes of heating zone 20 and is preferentially adsorbed in steaming zone 19. The stripping gas herein is preferentially adsorbed by the charcoal thereby preferentially desorbing the adsorbed rich gas constituents which pass upwardly to rich gas disengaging zone 18. As described above, a part of this preferentially desorbed gas passes into rectification zone 17 while the remaining portion is removed via line 54 as a rich gas product.

The charcoal flowing from steaming zone 19 into the tubes of heating zone 20 is partially stripped, the major proportion of the adsorbed constituents having been removed in steaming zone 19. In heating zone 20 the partially stripped charcoal is indirectly heated by heated flue gases or condensing vapors or the like passed outside the tubes through inlet or outlet pipes 63a and 64a. The charcoal herein is heated to a temperature of about 450° F. to 500° F. and contacted directly with the stripping gas introduced as above described into engaging zone 21. A substantially complete desorption of the adsorbed constituents is hereby effected and the charcoal leaving the bottom of heating zone 20 is substantially completely free of adsorbed constituents of the feed gas and is saturated at the stripping temperature with the stripping gas. At a temperature of about 500° F. the quantity of adsorbed material is very low, less than 1% or 2% by weight.

The hot lean charcoal passes through adsorbent feeder zone 22 in which a reciprocating type feeder meters a controlled volume of charcoal from a multiplicity of small areas covering the cross sectional area of the column. This adsorbent feeder mechanism is more clearly described, illustrated and claimed in copending application Serial No. 618,347, filed September 24, 1945, now U. S. Patent No. 2,544,214, and its incorporation in the selective adsorption column insures a substantially uniform adsorbent flow rate over the entire cross sectional area of the system. The adsorbent discharging from feeder zone 22 collects in bottom zone 23 as accumulation 65 wherefrom it flows through sealing leg zone 24 into charcoal flow control valve chamber 25. The flow control valve consists of valve head works 66, which may be electrically or pneumatically operated, gas seal 67, valve stem 68, and valve plate 69, which latter has a cross sectional area somewhat greater than the cross sectional area of the lower open end of sealing leg zone 24. In conjunction with level controller 70, one modification of this apparatus involves varying the opening of the flow control valve to maintain a predetermined level of charcoal in bottom zone 23. In another modification, the control valve may be eliminated and level controller 70 may maintain the desired charcoal level in bottom zone 23 by controlling the rate of flow of adsorbent pressured through pressuring means 27. In a third modification the level may be maintained by actuating control valve 71 to alter the rate of solids conveyance, although the first two modifications described are preferred.

In order to insure that the rich gas removed from disengaging zone 18 is not contaminated by the gas employed in conveyance of the charcoal from the bottom to the top of the column and to insure that the stripping gas is not allowed to enter the lift line in appreciable quantities, a seal gas comprising a mixture stripping gas and lift gas is removed from charcoal flow control chamber 25 via line 72 at a rate controlled by valve 73. A small quantity of stripping gas passes downwardly through sealing leg 24 and a small amount of the lift gas from pressuring means 27 passes upwardly through transfer line 26 to form the seal gas mixture. Since pressuring means 27 operates to transfer adsorbent from a low pressure in transfer line 26 to a higher pressure in lower transfer line 28, a small portion of lean gas may be bled back via line 74 controlled by valve 75 into transfer line 26 to prevent stripping gas from passing downwardly therethrough. The pressure differential existing across pressuring means 27 is substantially equal to the pressure differential maintained across the lift line.

Pressuring means 27 is required as an essential part of the operation of this modification of selective adsorption process since the pressure drop existing from the bottom to the top of the conveyance means is of the order of 25 to 100 pounds per square inch depending upon the length. Since the pressure drop of gases flowing through the selective adsorption column is substantially less than this and the absolute pressure at the top of the lift line and the top of the selective adsorption column are the same, pressuring means 27 is required to transfer granular charcoal from the pressure of the bottom of the adsorption column to a higher pressure existing at the bottom of the lift line. There are a number of types of apparatus which may be employed to accomplish this function such as the system of locks conventionally employed in the gas industry for introducing coal into continuous cokers or gas producers and the like, or other means such as those shown in Figures 4, 5, and 6 of the accompanying drawings and which will subsequently be described.

The granular charcoal, raised in pressure from about 130 pounds per square inch absolute to about 180 pounds per square inch absolute by pressuring means 27 passes downwardly through lower transfer line 28 into induction zone 29 to establish charcoal accumulation 31. Induction zone 29 conveniently comprises a cylindrical pressure vessel through the top of which extends lift line 76 to a depth somewhat below level 77 of charcoal accumulation 31. Lift line 76 is provided at its lower extremity with flow restriction 78 by means of which the lower open area of the lift line is decreased to between about 0.1 and 0.9 of the cross sectional area of the remainder of lift line 76. It has been found convenient to employ a flow restriction 78 having a lower opening of about one-quarter of the cross sectional area of the column. This reduction in area causes increased lift gas flow velocities at this point sufficient to suspend the granules in the lift gas and move them into the bottom of the lift line. Once inside the bottom of the line the velocity decreases and the granules are maintained in a substantially compact state having the static bulk density of the material. Presumably other methods for restricting this lower opening may be employed such as the use of orifices, Venturi type restrictions, and the like. Lift gas is introduced into induction zone 29 by means of line 79 controlled either by valves 71 or 80 depending upon the type of control employed. Control valve 71 may be left wide open, the lift gas flow rate controlled by means of valve 80 which may be actuated either by differential pressure recorder controller 81 in accordance with the differential pressure across the lift line or may be actuated by adsorbent level controller 82 in accordance with charcoal level 77 in induction zone 29.

Lift gas, as pressured by the means described above into the gas space of induction zone 29, flows downwardly through the interstices of granular adsorbent in accumulation 31 and passes into the lower open end of lift line 76. In this particular example wherein 122,200 pounds per hour of granular charcoal are circulated, the rate of flow of lift gas is 11,000 standard cubic feet per hour and is introduced at a pressure of about 180 pounds per square inch absolute. It is significant here to note that in the conveyance means described herein, 0.09 standard cubic foot of lift gas per pound of charcoal is used in lifting whereas, between 5 and 15 standard cubic feet per pound are required where the charcoal is fluidized or suspended in the lift gas. This gas passes upwardly through lift line 76 depressuring to about 130 pounds per square inch absolute at separator 32 at the top of the lift line. In passing upwardly through the interstices of the granular adsorbent which is maintained in the lift line in a solid compact condition, frictional forces of the gas which result are sufficient to overcome the downwardly acting forces of gravity and lift line wall friction on the adsorbent granules and to move the compact mass of adsorbent upwardly through lift line 76 as a substantially compact moving bed having very nearly the static bulk density.

Separator 32 is provided with thrust plate 33 supported therein by means of support 83. The presence of this plate maintains the moving adsorbent in a substantially compact state and prevents fluidization. It is spaced from the upper end of lift line 76 a distance sufficient to cover an area determined by the angle of repose and the area of the lift line. Thrust plate may be eliminated if very careful lift gas pressure control is maintained in the induction zone so that the solids flow smoothly over the edge of the upper open end of the lift line 76. The lift gas disengages from the charcoal and may be removed via line 84 controlled by valve 85 and introduced into separator 86 wherein suspended charcoal fines are removed from the lift gas. The lift gas subsequently passes by means of line 87 to compression means not shown whereby the lift gas is raised to 180 pounds per square inch absolute and reintroduced into induction zone 29 as described above. In another modification and one which is preferred, the lift gas passes from separator 32 downwardly through upper transfer line 34 in the presence of the adsorbent and as substantially independent phases into the upper portion of selective adsorption column 10. Baffle 88 causes the downwardly moving adsorbent to enter tube 89 which is introduced into throat 90 of elutriation tray 91. Herein the downwardly moving adsorbent contacts the upwardly flowing lean gas fraction known as the purge gas and the adsorbent fines present in the charcoal are suspended in this gas in throat 90 leaving the adsorbent particles having the desired size range substantially free of fines. The elutriated adsorbent enters charcoal storage zone 12 to establish level 92 shown. Level indicator 93 detects or indicates a low or high level and additional adsorbent is added or removed to maintain proper operation. The elutriation gas or purge gas containing suspended adsorbent fines may be removed from zone 11 by means of line 94 controlled by valve 95 or they may be preferably removed via line 43 controlled by valve 44 and combined with the lean gas product as described above. Part of the lean gas product is compressed from 130 pounds per square inch pressure to 180 pounds and is employed as the lift gas. Lift gases which are not involved in the separation as part of the feed or as a product may be employed with this lift line. Thus, high density and viscosity gases may be used without contaminating the products. In this type of operation the lift gas is removed through line 84 controlled by valve 85 and the purge gas is removed via lines 43 and/or 94 from elutriation zone 11. Maintenance of separator 32 and elutriation zone at the same pressure by control of valves 85 and 95 and/or 44 insures that no gas flow through transfer line 34 results. The seal gas containing lift gas and stripping steam is simply separated by condensation if desired. More effective lift gases include the rich gas product, in which case no seal gas need be removed, as well as such gases as steam, carbon dioxide, air, or the like.

For solid flow lift lines according to this invention having diameters of from about 2 to about 12 inches, the flow rate for granular carbon, pressure drop, height, and diameter are correlated by the following relation:

$$Q = 1.89 \frac{\Delta P}{L} - 70 D^3$$

where Q is carbon rate in pounds per hour, $\Delta P$ is pressure differential across the lift line in pounds per square foot, L is height of line in feet, and D is the line diameter in inches. This equation has been found applicable up to values of $\Delta P/L$ as high as 150.

As above indicated, the lift gas pressure at the bottom of lift line 76 was about 50 pounds per square inch greater than the pressure in separator 32. A material expansion of lift gas occurs during its passage through the compact bed of adsorbent in the lift line causing the lineal gas velocity in the upper sections of the lift line to be somewhat greater than those in the lower part of the lift line. It has been found that such velocity increases throughout the length of a single lift conduit have an adverse effect upon the smooth operation of the apparatus. At high solids conveyance rates voids tend to form in the upper sections of the lift line due to the suspending effect of the increased gas velocity. When the pressure drop across the lift line exceeds about 10% of the absolute pressure of operation such adverse effects are noted at high solids flow rates and preferably compensation should be made for them.

In Figures 2 and 3 are shown preferred modifications for counteracting this expansive effect by increasing the cross sectional area of the line in the direction of flow so that the lineal gas velocity is substantially constant throughout the length of the lift line and that uniformly smooth lifting operations may be effected over a wide range of adsorbent or solids circulation rates.

The fundamental design equation relating to this expansion effect across solid flow lift lines according to this invention is given below.

$$\frac{A_x}{3}\left[\frac{A_0}{A_x}\right]^3 + A_x = \frac{aQ}{0.1\mu g \rho^2}\left[\frac{P_0 - P_x}{P_x}\right] + 1.33 \, A_0 \frac{P_0}{P_x}$$

The characters in the above equation have reference to the following:

$a$ is the volume per cent voids of the granular solids, A the cross sectional area of the lift line in square feet, and P refers to absolute gas pressure, subscript zero refers to the bottom of the lift line exclusive of the restricted section and subscript $x$ refers to a point $x$ feet from the bottom of the lift line, $g$ is the gravitational constant 32.2 feet/sec.$^2$, $\mu$ is the gas viscosity in centipoise, $\rho$ is the bulk density of the adsorbent in pounds per cubic foot, and Q is the adsorbent rate in pounds per second. An analysis of this relationship by graphical integration gives the solution for the degree of expansion occurring during transferral of a moving bed of solids upwardly through the lift line according to this invention and will give directly the increase in cross sectional area relative to the cross sectional area at the bottom of the lift line necessary to maintain a constant lineal gas velocity.

In the case of the example given above in connection with Figure 1, solution of the above equation for the conditions of pressure given therein indicate that the lift line at the bottom requires a diameter of 8 inches and a diameter of 11.2 inches at the top. In Figures 2 and 3 are shown two modifications of lift conduits fabricated in accordance with the design equation given above. In Figures 2 and 3, parts having the same significance as in Figure 1 are indicated with the same reference numbers.

In Figure 2 lift line 76 comprises a tapered conical lift line preferably fabricated from rolled sheet steel and provided with a welded seam not shown. Lower diameter $d_1$ is the required 8 inches, while the upper end the conical lift line has a diameter $d_2$ of about 11.2 inches. In Figure 3 a compromise with the design shown in Figure 2 is made in which the lift line is fabricated in two sections with an intermediate conical section 96 of short length connecting the lower section 97 provided with diameter $d_1$ of about 8 inches with upper section 98 having diameter $d_2$ of 10 inches. In this modification the lineal gas velocity at the upper end of section 97 is somewhat increased over the gas velocity of the lower end of that section but is not increased sufficiently to cause the formation of voids or lift gas bubbles by suspension or other types of discontinuity of moving bed in the lift line. The same condition is true at the upper section of 98 wherein the diameter is 10 inches and the diameter necessary according to previous calculations indicated that a diameter of 11.2 is required. The modification shown in Figure 3 obviously is a mechanical expedient since the fabrication of conical sections having low included angles in lengths required for lift lines employed with the selective adsorption process is somewhat complicated. If necessary the modification shown in Figure 3 may be made in a number of cylindrical sections joined by conical sections such as 96 to more closely approximate the conical shape shown in Figure 2. Such sectioned lift lines may have 3, 4, 5 or more connected cylindrical sections.

The foregoing descriptions have included lift lines of circular cross section, however, the principles of the invention may also be applied to lift lines of noncircular cross section. As a matter of fact, the noncircular lines are more easily fabricated to compensate for the lift gas expansive effect discussed above. In one modification, the lift line has an equilateral triangular section in which a linear or exponential increase in area in the direction of flow is permissible. In another modification a square or rectangular cross section is employed in which area is increased with height along the line. In a third modification, a cylinder having the required cross section is flattened to give a decrease in section along its length from top to bottom so that its top section is circular, the bottom section is a flattened ellipse. Other sections also may be employed to give the desired area change.

Referring now more particularly to Figure 4 a simple piston displacement apparatus is shown which is employed as pressuring means 27 shown in Figure 1. This apparatus comprises cylinder 100 provided with piston 101 and piston rod 102. It is further provided with solids inlet line 103 controlled by valve 104, solids outlet line 105 controlled by valve 106 and gas equalizing line 107 controlled by valve 108. Valves 104 and 106 are preferably a gate type or plug cock type of valve through which solids may be transferred without impairing the seal. Valves 104, 106 and 108 are further preferably pneumatically or electrically actuated in a timed sequence having a known and constant relationship to the position of piston 101. With valves 106 and 108 closed and the piston displaced to the left in expanded position, valve 104 opens and introduces a quantity of granular solids to form accumulation 109. Valve 104 closes as piston 101 moves to the right, compressing gas in space 110 to a pressure equivalent to that of the induction zone shown in Figure 1. At the completion of the compression stroke, valve 106 opens and the adsorbent is discharged through line 105. Valve 106 closes after discharge of the solids and piston 101 moves to the left in the expansion part of the cycle which when complete causes valve 108 to open and the excess of gas pressure above that present in line 103 is dissipated through line 107.

This excess of gas pressure arises from the fact that during compression part of the volume is taken up by incompressible solids and during the expansion part of the cycle there are no incompressible solids present in the cylinder. Because of the presence of the solids during compression, less gas need be compressed to reach the downstream pressure with a given piston displacement and the same displacement with a greater volume of gas decreases the pressure only to an intermediate pressure.

Line 107 and valve 108 are therefore provided to bleed off this excess of pressure and preferably to introduce it into line 103. A surge chamber not shown is desirable to keep this bleed gas entering line 103 at a constant rate. The gas thus bled off is introduced into disengaging zone 111 in line 103 corresponding to the introduction of gas above pressuring means 27 via line 74 controlled by valve 75 into transfer line 26 shown in Figure 1. This supplies the lift gas part of the seal gas to prevent the introduction of stripping gas with granular adsorbent passing through the pressuring means. The back flow of lift gas through pressuring means is necessary to the successful operation of the apparatus and is accomplished as just described.

It is essential that the bulk volume of granular solids 109 not exceed the compressed volume of cylinder 110 since the apparatus would destroy itself. However, smooth operation results when the compression ratio taking the volume of incompressible solids into account does not materially exceed the compression ratio employed in conventional gas compressors. Exceeding this compression ratio in an apparatus of the type shown in Figure 4 is not particularly detrimental since upon expansion a substantial degree of cooling is obtained. Provision should be made, however, to dissipate the remaining heat of compression. The presence of granular solids in the gas also modifies the cooling duty required since part of the heat is absorbed in the solids.

Referring now more particularly to Figure 5, a modification of the apparatus of Figure 4 is shown in which line 112 controlled by valve 113 introduces granular solids in the inlet chamber 114 on the low pressure side of divider 115. A rotating cylinder section 116 provided with a series of bored cylinders 117 revolves about eccentric shaft 118. During this rotation, pistons 119 in each of cylinders 117 rise and fall since they are pivotably connected by means of connecting rods 120 to eccentric shaft slip ring 121. Eccentric shaft 118 does not revolve and cylinder 116 is rotated by an external rotary means not shown. As cylinder 116 rotates pistons 119 are in the lowered position as they pass open mouth 122 of inlet chamber 117. Granular solids are directed by baffle 123 into the open cylinder which then passes under graphite seal 124 into the high pressure side of divider 115. This seal completely covers cylinders 117 as they pass under and prevents gas flow. On the left side of the divider, pistons 119 rise through cylinders 117 and expel the granular solids into outlet chamber 125 forming an accumulation 126. The solids are withdrawn via line 127 controlled by valve 128. If desired, valve 128 may be actuated by a level controller not shown, operating in conjunction with the relative size of accumulation 126. As in the modification described in Figure 4, a small quantity of lift gas preferably is introduced via line 129 controlled by valve 130 into engaging zone 131 in line 12 to pass upwardly into chamber 25 of Figure 1 from which it is removed as the seal gas. Preferably in the operation of this mechanism a purge gas is introduced into crank chamber 132 to prevent the leakage of adsorbent fines thereinto. In a well fabricated piece of apparatus of this type, piston 119 fits tightly into cylinders 117 and may be employed to compress a gas from the upstream pressure of chamber 114 to the desired downstream pressure present in line 127 and outlet chamber 125. If desired this compression may be assisted by withdrawing a portion of gas from low pressure chamber 113 by means of line 134 controlled by valve 135 and compressing it to the desired discharge pressure and introducing the gas thus compressed via line 136 controlled by valve 137 into the high pressure side of the apparatus. Such a compression may supplement the compressive effect of pistons 119. When the pistons rise to their discharged position and the granular solids are expelled into accumulation 126 they pass over seal 138 into the low pressure side of the apparatus with counterclockwise rotation and accept an additional charge of granular solids to be pressured through the system.

The operation of pressuring means described in conjunction with the foregoing Figures 4 and 5 is markedly improved and simplified wherein the cooling zone 13 of Figure 1 is placed at the bottom of the unit so that granular adsorbent passing through the lift line is at the adsorbent temperature of about 100° F. Upon introduction of the adsorbent into this modification of the selective adsorption column shown in Figure 1, it passes first into the adsorption zone 15, next into rectification zone 17, then through steaming zone 19, heating zone 20, and through an internal sealing leg zone from which a mixture of purge gas and stripping gas is removed. From the sealing leg zone, the lean adsorbent passes through the cooling zone and subsequently is withdrawn at about atmospheric temperature from the bottom of the column. It then passes through the pressuring means described above into induction zone 29 for transferral to the top of the column. In this case a portion of the lean gas product is employed as lift gas and is compressed from the lean gas pressure by means of a compressor not shown in Figure 1 to the pressure existing at the bottom of the lift line.

Another means for introducing granular solids from a low pressure to a high pressure which may be employed in conjunction with the selective adsorption process is shown in Figure 6. In this apparatus a series of three pressuring vessels 140, 141 and 142 are employed. The solids to be pressured to a higher pressure are introduced via line 143, for example, into vessel 140. Valve 144 therefore is open while valve 145 is closed as are valves 146 and 147. Vessel 141 is in the process of emptying and valve 148 is open. Valve 149 of vessel 142 is also closed while gas at lift line pressure is introduced via line 150 controlled by valve 151 thereinto to raise the pressure prior to opening valve 149 so that vessel 142 may be emptied. When vessel 141 is empty, valve 148 is closed and valve 149 is opened and vessel 142 discharges into transfer line 152 at a higher pressure. Vessel 141 then is depressured through line 153 controlled by valve 154, this gas being recompressed to pressure up subsequent vessels or partly introduced into line 143 to become part of the seal gas described above in connection with Figure 1. After vessel 141 is depressured, valve 146 is opened and it is filled. When vessel 140 is filled, valve 144 is closed and it is pressured to the lift line pressure by means of gas introduced through line 155 controlled by valve 156. The foregoing sequences are maintained so that as one vessel is emptying another vessel is filling and the third vessel is being pressured or depressured prior to emptying or filling respectively.

A four inch diameter cylindrical lift line 20 feet in height having a five foot top section of four inch glass pipe was employed in lifting granular charcoal of 12.30 mesh size using air as the lift gas. The following results were noted:

| Pressure Drop, p. s. i. | Charcoal Rate, lb./min. | Charcoal Velocity, Ft./Sec. |
| --- | --- | --- |
| 10 | 106 | 0.58 |
| 16 | 160 | 0.875 |

The charcoal flowed smoothly as a solid plug through the conduit.

Although the improved conveyance method and apparatus disclosed above cooperates unusually well with the selective adsorption process and apparatus in the conveyance of large quantities of solid granular adsorbent, the conveyance method and apparatus is not to be considered as limited thereby since it may be applied to the conveyance of a wide variety of other granular solids such as catalysts in catalytic cracking, hydrogenation, hydrodesulfurization, oxidation and other known catalytic processes. It may be further applied to the conveyance of granular solids such as powdered coal, the loading and unloading of cereal grains into grain elevators from conveyance means therefor, it may be further used in the conveyance of minerals such as those employed in ore processing. In short, wherever granular solids are handled in industrial and agricultural applications the conveyance means of the present invention may be applied.

The improved selective adsorption process described herein has been illustrated as employing granular activated charcoal having a particle size of from 12 to 30 mesh as the adsorbent in the separation of hydrocarbon gaseous mixtures. It is also to be made clear that this type of gaseous mixture is not to be considered as a limitation to the process since other granular adsorbents may be substituted for granular charcoal and other gaseous mixtures whose constituents have variable degrees of adsorbability may be separated by employing the principles described herein.

The method and apparatus for the conveyance of granular solids and in subcombination with a method and apparatus for the separation of gaseous mixtures on a substantially compact moving bed of solid granular adsorbent is to be considered as limited only by the following claims.

I claim:

1. A method for conveying granular solids through a conveyance zone through which they would not flow in the same direction under the influence of gravity alone which comprises passing a conveyance fluid through a substantially compact moving bed of said solids in said conveyance zone at a velocity sufficient to overcome forces of gravity and friction forces of inner conveyance zone surfaces acting on said moving bed, discharging said moving bed from the outlet of said conveyance zone, and applying a solids compacting force to said moving bed discharging from said outlet to maintain said solids at said outlet and throughout said conveyance zone at a bulk density substantially equal to the static bulk density of said solids when at rest.

2. A method for conveyance of granular solids which comprises flowing a conveyance fluid through a conveyance zone concurrently with and at a rate sufficient to convey said granular solids, applying a force against the solids discharging therefrom thereby maintaining said solids during conveyance in the form of a moving bed having substantially the same bulk density as the static bulk density of said solids when at rest, and disengaging conveyance fluid from the solids thus conveyed while the solids are still at substantially their static bulk density.

3. A method according to claim 2 in combination with the steps of pressuring the conveyance fluid removed from said conveyance zone, and returning the thus repressured fluid to said induction zone to convey additional granular solids.

4. A method for conveyance of granular solids through a conveyance zone through which they would not flow in the same direction under the influence of gravity alone which comprises establishing an induction zone, a solids receiving zone and a conveyance zone communicating with the two aforementioned zones, establishing and maintaining an accumulation of granular solids in said induction zone having a solids level above the inlet opening of said conveyance zone therein, introducing a conveyance fluid into said induction zone at a pressure substantially above that of said solids receiving zone thereby causing said conveyance fluid to flow from said induction zone through said conveyance zone at a rate sufficient to convey said solids therethrough, and applying a compressive force to the mass of solids discharging into said solids receiving zone from the outlet opening of said conveyance zone thereby preventing solids fluidization therein and thereby maintaining said solids throughout said conveyance zone at a bulk density substantially equal to the static bulk density of said solids when at rest.

5. A method according to claim 4 wherein said conveyance fluid is a gas.

6. A method according to claim 4 in which the cross-sectional area of said conveyance zone is increased with distance from said inlet opening to maintain a relatively constant conveyance fluid velocity therein.

7. A method according to claim 4 in combination with the steps of passing said solids to be conveyed into a solids pressuring zone at a relatively low pressure, raising the fluid pressure therein to a higher pressure, and discharging said solids at said higher pressure into said induction zone.

8. A method according to claim 4 wherein said compressive force is applied to the solids discharging from said conveyance zone outlet by the step of discharging said solids from said conveyance zone outlet against a transverse thrust plate spaced apart from said outlet opening.

9. A method for conveying granular solids which comprises passing a gas through a substantially compact bed of granular solids in a conveyance conduit at a velocity sufficient to counteract forces of gravity and friction forces of inner conduit surfaces acting on said granular solids to move said granular solids therethrough as a compact bed, and applying a thrust force against the solids discharging from said conduit to prevent solids fluidization in said conveyance gas and to maintain the bulk density of said compact bed at a value substantially equal to the static bulk density of said solids when at rest.

10. A method for conveyance of granular solids which comprises establishing an induction zone, a separation zone and an elongated conveyance zone communicating with the two aforementioned zones, establishing and maintaining an accumulation of substantially compact granular solids having a level above the inlet opening of said conveyance zone within said induction zone, introducing a lift gas into said induction zone, maintaining said induction zone at a pressure substantially above that maintained in said separation zone thereby causing said lift gas to flow through said conveyance zone at a velocity sufficient to overcome forces of gravity and friction acting on said solids and to convey said solids therethrough, applying a compressive force to the solids discharging into said separation zone from the outlet opening of said conveyance zone thereby maintaining said solids therein during conveyance at a bulk density substantially equal to the static bulk density of said solids when at rest, disengaging said lift gas from said solids thus conveyed, and removing said solids and said lift gas as substantially independent phases from said separation zone.

11. A method for the conveyance of granular solids which comprises establishing an induction zone and a separation zone and an elongated conveyance zone communicating therebetween, passing granular solids to be conveyed into said induction zone to establish and maintain a solids accumulation therein having a level above the inlet opening of said conveyance zone therein, passing a lift gas into said induction zone under pressure relative to that maintained in said separation zone thereby causing the gas thus introduced to pass through said solids accumulation in said induction zone and into and through said conveyance zone, controlling the lineal lift gas velocity through the interstices of the substantially compact mass of solids in said conveyance zone at a value sufficient to generate a pressure differential which counteracts gravitational forces and frictional forces of inner conveyance zone surfaces acting on said solids and thereby convey said solids therethrough into said separation zone, applying a compressive force to the mass of granular solids discharging from said conveyance zone into said separation zone to maintain said solids in said conveyance zone at a bulk density substantially equal to the static bulk density of said solids when at rest, disengaging said lift gas from said granular solids in said separation zone, and removing said gas and said solids as substantially independent phases therefrom.

12. A method according to claim 11 wherein said rate of removal of granular solids from said separation zone is controlled in accordance with the level of said solids accumulation maintained in said induction zone.

13. A method according to claim 11 in combination with the step of controlling the flow rate of lift gas introduced into said induction zone in accordance with the differential pressure existing between said induction zone and said separation zone.

14. An apparatus for conveying granular solids which comprises an elongated conveyance conduit, means for maintaining an accumulation of said solids at the inlet of said conveyance conduit, means for passing a conveyance fluid through said conveyance conduit to convey said solids concurrently with said conveyance fluid from said inlet to the outlet of said conveyance conduit, means for applying a compacting force against solids discharging at said outlet to maintain the solids at a bulk density substantially equal to the static bulk density of said solids at said outlet and throughout said conveyance conduit, and means for removing said solids and said conveyance fluid from said outlet.

15. An apparatus for conveyance of granular solids which comprises an elongated conveyance conduit communicating an induction chamber with a solids receiving vessel, a solids inlet to said induction chamber, a conveyance fluid inlet thereto, means adjacent the outlet opening of said conveyance conduit adapted to apply a solids compacting force against the solids discharging therefrom thereby maintaining the solids therein at substantially the static at-rest bulk density of said solids, and means for removing conveyed solids and depressured conveyance fluid from said solids receiving vessel.

16. An apparatus according to claim 15 wherein said elongated conveyance conduit is provided with a cross-sectional area which increases in the direction of flow to at least partially compensate for conveyance fluid expansion therein.

17. An apparatus according to claim 16 wherein said conveyance conduit is tapered to provide said cross-sectional area which increases in the direction of solids flow.

18. An apparatus according to claim 16 wherein said conveyance conduit comprises a succession of aligned cylindrical sections of increasing diameter in the direction of solids flow.

19. An apparatus according to claim 15 in combination with a solids pressuring means adapted to increase the pressure of fluids filling the interstices of solids therein, means for introducing solids to be conveyed into said pressuring means, the solids outlet of said pressuring means communicating with said solids inlet to said induction chamber.

20. An apparatus according to claim 19 wherein said pressuring means comprises at least one pressuring vessel in combination with means for alternately introducing a fluid to raise the pressure and removing fluid to lower the pressure therein.

21. An apparatus according to claim 20 wherein a plurality of said pressuring vessels is provided, each being depressured, filled, pressured and emptied in sequence to deliver pressured solids continuously to said induction chamber.

22. An apparatus according to claim 15 wherein said conveyance conduit is provided with a restricted inlet opening having a cross-sectional area between about 0.1 and about 0.9 of the cross-sectional area of said conduit.

23. An apparatus for the conveyance of granular solids which comprises an induction chamber, means for introducing granular solids into said induction chamber to establish a compact accumulation therein, a separation chamber, a conduit opening directly into said accumulation of solids in said induction chamber and communicating with said separation chamber, a thrust plate in said separation chamber adjacent to the outlet opening of said conduit therein, means for introducing a lift gas under pressure into said induction chamber to pass concurrently with a substantially compact moving mass of granular solids through said conduit, means for removing lift gas from said separation chamber, and means for removing solids from said separation chamber.

24. An apparatus for the conveyance of a substantially compact mass of granular solids which comprises a cylindrical induction chamber and cylindrical separation chamber axially aligned, transfer line means for introducing a substantially compact mass of granular solids into said induction chamber to form an accumulation therein, a conduit opening into the bottom of said separation chamber and into the top of said induction chamber and extending to a point below the level of said accumulation, means for introducing a lift gas into the gas space above said accumulation of solids in said induction chamber, restrictive means at the bottom of said conduit causing the introduction of lift gas and granular solids thereinto, thrust plate means adjacent the outlet opening of said conduit in said separation chamber for preventing fluidization of said solids in said conduit, and means for removing lift gas and granular solids from said separation chamber as substantially independent phases.

25. An apparatus according to claim 24 wherein said conduit comprises a cylindrical tube.

26. An apparatus for the lifting of granular solids which comprises a cylindrical induction chamber, solids inlet means for introducing granular solids to be conveyed into said induction chamber to establish an accumulation of compact granular solids therein, a lift line conduit open at both ends and extending from a point within said induction chamber substantially below the level of the compact solids accumulation therein and into a cylindrical separation chamber, means for introducing a lift gas under pressure into the gas space of said induction chamber to pass into said lift line and then upwardly concurrently with the substantially compact mass of solids therethrough into said separation chamber, thrust plate means for applying a thrust force against the compact solids discharging from said lift line thereby preventing fluidization of said solids therein and maintaining said solids therein at a bulk density substantially equal to the static bulk density of the solids when at rest, means for removing solids from said separation chamber, means for removing lift gas from said separation chamber, means for compressing the lift gas, and means for returning it to said induction chamber.

27. An apparatus according to claim 14 wherein said conveyance conduit is provided with a restricted inlet opening having a cross-sectional area less than the cross-sectional area of said conduit.

28. An apparatus according to claim 14 wherein said elongated conveyance conduit is provided with a cross-sectional area which increases in the direction of flow to at least partially compensate for conveyance fluid expansion therein.

29. An apparatus according to claim 15 in combination with means for controlling the rate of removal of granular solids from said solids receiving vessel.

30. A mass flow elevator for discrete granular material which comprises a pressure tight transfer chamber at a relatively low elevation, a gas releasing chamber at a relatively high elevation, a lift leg in communication with said chambers, said lift leg extending to the lower part of said transfer chamber, means to apply a gas pressure to said transfer chamber above the lower end of the lift leg, a baffle in said gas releasing chamber, said baffle surmounting the discharge end of said lift leg and adapted to form with the walls of the gas releasing chamber a pile of granular material over the end of the lift leg, a granular material outlet conduit extending from a lower portion of said gas releasing chamber, and a solids flow control means in said outlet conduit, said solids flow control means having a capacity less than the lift leg to force the lift leg to run dense packed and to control the rate of elevation of particles in the lift leg.

31. In a continuous cyclic contact method in which discrete particles of solid material are passed repeatedly through a contact zone, a reconditioning zone, a transfer zone, a gas releasing zone, and inter-connected conduits forming a closed cyclic path, one of said conduits constituting a lift leg extending upwardly from the transfer zone to the gas releasing zone from which the particles return by gravity flow, the improvement which comprises applying a gas to the transfer zone at a level above the lower end of the lift leg and under sufficient pressure to produce a gas flow creating a pressure drop in excess of the gravitational weight of the column of particles in the lift leg plus the frictional resistance to flow of the particles through the lift leg, positively sealing the solids inlet to the transfer zone against the required lifting pressure during the lifting step, intercepting the discharge flow of particles from said lift leg directly upon their discharge from the upper end of the lift leg and thereby diverting said discharge flow to form a flowing pile of particles which submerges the discharge end of said lift leg and extends to the bottom of said gas release zone, and controlling the rate of flow of particles from said pile to maintain a maximum-packed nonfluid particle density throughout the lift leg with the particles in constant contact with each other without turbulent motion whereby the solids density is independent of velocity of gas flow at a constant solids rate, and whereby an increase in gas flow causes an increase of pressure drop only, at the constant solids rate.

32. A method according to claim 31 wherein said contact zone comprises a catalytic hydrocarbon conversion zone.

33. A method of transferring solids in a contact system between confined zones maintained under independent gaseous pressures which comprises maintaining a vertically extending column of the solids in communication with one of the zones at its lower end and in communication with the other of the zones at its upper end, introducing a gaseous medium into the zone in communication with the lower end of the column in an amount adapted to elevate the solids from the said zone to the zone in communication with the upper end of the column, and intercepting the discharge of solids from the upper end of the column by other solids to compact the solids in the column whereby fluidization of the solids is prevented and the solids density is independent of the velocity of gas flow.

34. A method of transferring particles of solid contact material in a fluid contact system between confined zones maintained under different gaseous pressures, which comprises maintaining a compacted column of the particles in communication with a zone of higher pressure at one end, and in communication with a zone of lower pressure at its other end, throttling the discharge of particles from said column at the low pressure end by the particles previously discharged to maintain the particles in the column in a compacted non-fluidized state, the length of said column being such that the solids will establish a pressure drop approximating the difference between the pressures of the two zones, and introducing the particles of solid material from one of said zones into said column at the end in communication therewith to replace solid material discharge from the other end of said column into the other of said zones.

References Cited in the file of this patent

UNITED STATES PATENTS

| Number | Name | Date |
|---|---|---|
| 584,021 | Tilghman | June 8, 1897 |
| 727,030 | Tilghman | May 5, 1903 |
| 788,741 | Trump | May 2, 1905 |
| 1,825,707 | Wagner | Oct. 6, 1931 |
| 1,893,505 | Nungessa | Jan. 10, 1933 |
| 1,898,354 | Fickey | Feb. 21, 1933 |
| 2,304,827 | Jewell | Dec. 15, 1942 |
| 2,328,240 | Wilgand | Aug. 31, 1943 |
| 2,413,479 | Wilgand | Dec. 31, 1946 |
| 2,493,911 | Brandt | Jan. 10, 1950 |

FOREIGN PATENTS

| Number | Country | Date |
|---|---|---|
| 180,397 | Great Britain | May 11, 1922 |
| 268,667 | Great Britain | Apr. 7, 1927 |